Dec. 6, 1966    J. F. BENNETT    3,289,771
PRECISION TILLAGE UNIT
Filed Dec. 17, 1964    2 Sheets-Sheet 1
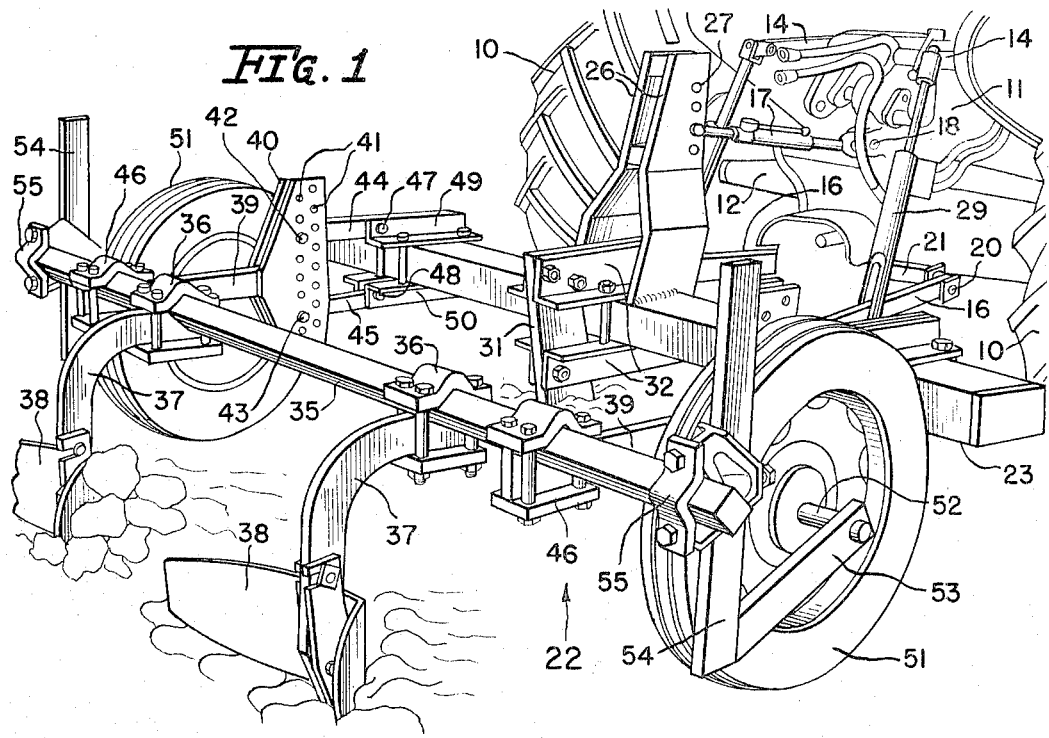
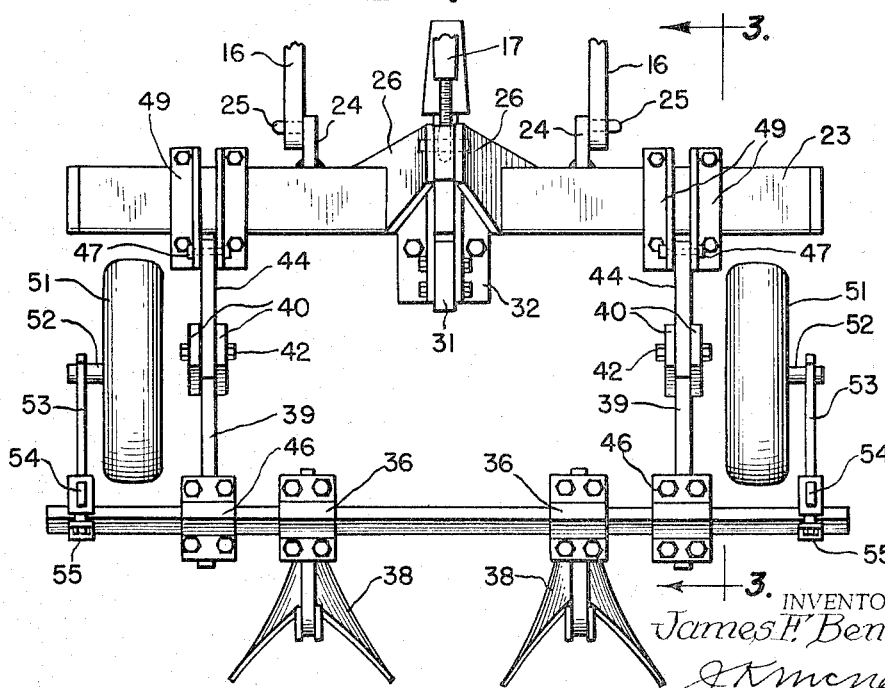
INVENTOR.
James F. Bennett

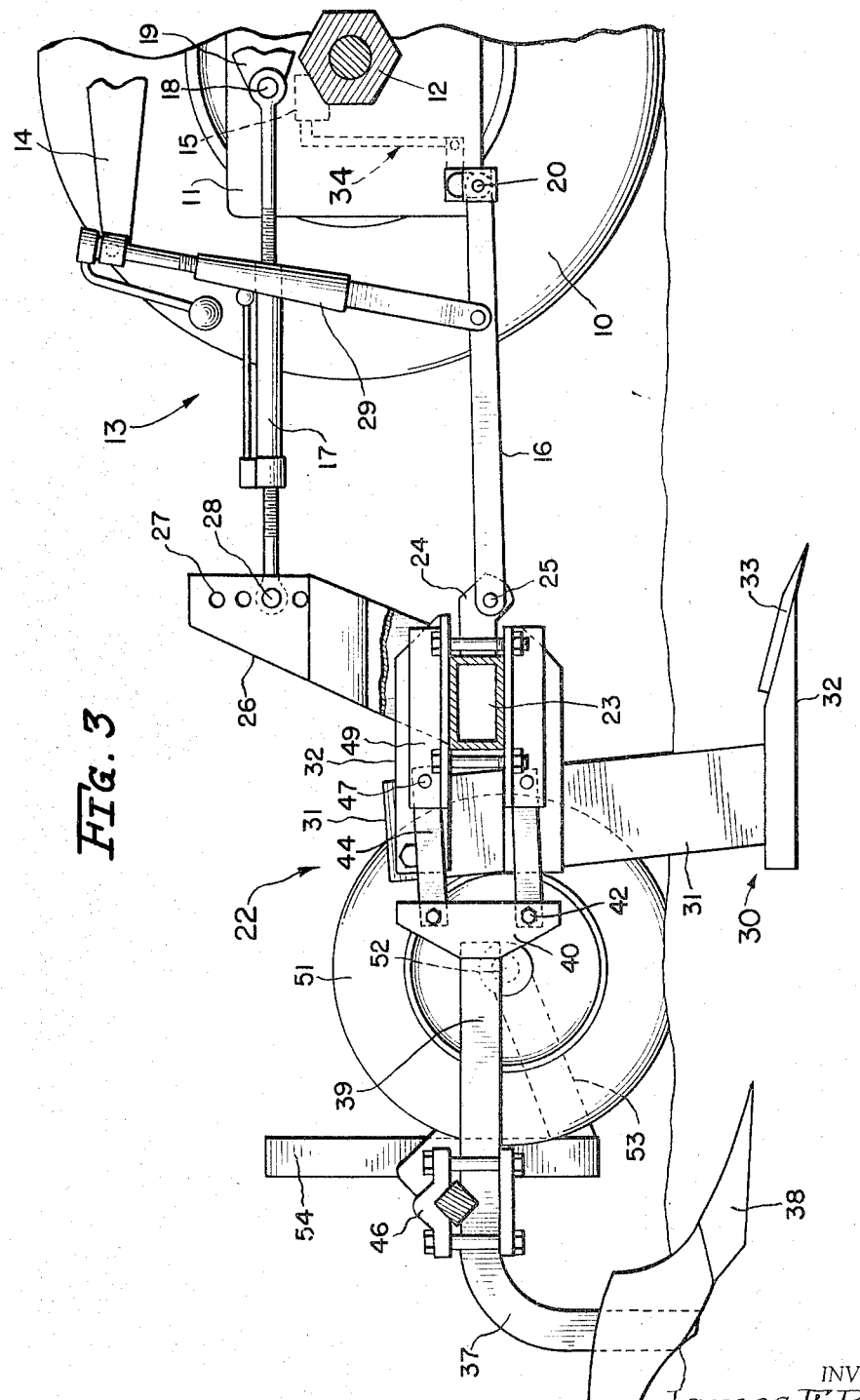

United States Patent Office 3,289,771
Patented Dec. 6, 1966

3,289,771
PRECISION TILLAGE UNIT
James Frederick Bennett, Stockton, Calif., assignor to International Harvester Company, Chicago, Ill., a corporation of Delaware
Filed Dec. 17, 1964, Ser. No. 419,073
3 Claims. (Cl. 172—155)

This invention relates to agricultural implements and particularly to soil tilling apparatus.

The invention has for its object the provision of improved apparatus for preparing the soil for planting.

Another object of the invention is the provision of improved tilling machinery wherein one set of tools is adapted to penetrate relatively deeply into and form an opening in the soil to improve water penetration, and another set of tools are arranged to penetrate the ground relatively shallowly at opposite sides of said opening and to throw dirt laterally to form a bed directly over said opening.

Another object of the invention is the provision of an improved tillage machine including a first set of tools connected to a tractor having draft-sensing hitch means thereon to which said first set of tools is responsive, and a second set of tools having free vertical movement with respect to the first set of tools and arranged to cooperate therewith to form a bed for planting wherein the soil below the bed has been penetrated relatively deeply.

Other objects and advantages of the invention will become clear from the following detailed description when read in conjunction with the accompanying drawings wherein:

FIGURE 1 is a view in perspective showing the rear end of a tractor having draft-sensing hitch means thereon and having attached thereto an implement incorporating the features of this invention;

FIGURE 2 is a plan view on a somewhat smaller scale of the implement shown in FIGURE 1, and FIGURE 3 is a section taken on the line 3—3 on an enlarged scale of the implement shown in FIGURE 2 and illustrating the connection of the implement to the tractor.

In the drawings, the numeral 10 designates the laterally spaced rear drive wheels of a tractor having a body 11 and a transverse rear axle structure 12. The tractor is provided with draft-sensing implement hitch means 13 including laterally-spaced lift arms 14 adapted to be swung vertically by any suitable hydraulic power lift mechanism incorporated in the tractor but not shown, controlled by operation of a hydraulic valve 15.

Hitch 13 also includes a pair of laterally-spaced lower hitch links 16 and an adjustable upper link 17 triangularly arranged with respect to links 16 to form a three-point hitch. Upper link 17 is pivotally connected at 18 to a lug 19 on the tractor body and the lower links 16 are pivotally connected to crank arms 20 at the ends of a transverse shaft structure 21 carried by the tractor. Shaft structure 21 is part of a torsion bar draft-sensing apparatus, the details of construction of which form no part of this invention.

The implement of this invention is a precision tillage machine generally indicated by the numeral 22 and includes a generally rectangular transversely extending tool carrier in the form of a beam 23 having a pair of lugs 24 affixed to and projecting forwardly therefrom and having hitch pins 25 thereon for pivotal connection to the rear ends of lower links 16. A pair of upwardly converging uprights 26 are affixed to the beam and provided with a plurality of openings 27 for the reception of a pivot pin 28 to which the rear end of upper hitch link 17 is pivotally connected.

The lower links 16 connected to lugs 24 and upper link 17 connected to mast or upright 26 form a stable connection between the implement and tractor accommodating vertical movement of the implement with respect to the tractor between operating and transport positions. Lifting of the implement is accomplished by rocking of the lift links 14, which are connected to lower links 16 by adjustable lift links 29.

An earth-working tool in the form of a subsoiler 30 includes a standard 31 secured to beam 23 by clamping means 32 and having at its lower end a subsoiler shoe 32 and point 33, adapted to penetrate relatively deeply into the ground to break up the subsoil and open a slot therein.

The subsoiler 30 encounters varying soil conditions increasing and decreasing the draft load on the tractor. When obstacles or abnormally difficult soil conditions are encountered by the subsoiler 30, the depth of penetration of the point 33 is automatically varied by the draft load taken through hitch links 16. This draft load is transmitted to the torsion bar shaft structure 21 through crank 19 in a manner best described in copending U.S. application Serial No. 287,732, filed May 23, 1963, rocking of crank 19 being transmitted through linkage 34 to the valve 15 controlling the hydraulic lift mechanism, not shown, of the tractor. Actuation of the hydraulic lift in this manner causes rocking of lift arm 14 to raise or lower the hitch means 13 and therefore the beam 23 and subsoiler 30 to compensate for the changes in draft load on the implement. The subsoiler 30 is thus capable of controlled vertical movement relative to the tractor depending upon soil conditions, and is also capable of being raised to a transport position above the ground.

In order to provide a planting bed in which field compaction is minimized and penetration of water into the zone of plant root growth, as well as the physical characteristics of the plant root system, are improved. Applicant has found that this end is accomplished by forming the plant bed directly over the slot cut in the subsoil by the subsoiler blade. This is accomplished by the provision of another tool carrier consisting of a transverse bar 35 having mounted thereon by means of clamps 36, tool beams 37, one disposed at each side of the path of travel of the subsoiler 30, and rearwardly thereof. The earth-working tools at the ends of supporting beams 37 are lister bottoms 38, although it may be understood that any relatively shallowly penetrating earth-working tools designed to throw dirt toward the opening made by the adjacent subsoiler 30 come within the purview of this invention. Dirt is thrown both inwardly and outwardly by the lister bottoms 38 and the outwardly thrown dirt could be utilized to cover the opening made by another subsoiler, should it be desired to provide a multi-unit implement.

Tool carrier 35 is connected to the forward tool carrier 23 for free vertical floating movement with respect thereto by the provision of laterally-spaced forwardly-extending bars 39 to the ends of which are secured pairs of vertically-extending attaching plates 40 having a plurality of openings 41 therein for pivotal connection at 42 and 43 to the rear ends of vertically-spaced pairs of parallel links 44 and 45, respectively. Bars 39 are secured to tool bar 35 by clamps 46, and the forward ends of links 44 and 45 are pivotally connected at 47 and 48 to angle bar clamping elements 49 and 50, respectively, secured to beam 23.

In order that the tool carrier and lister units 38 may be able to float vertically independently of the vertical movement of beam 23 and to maintain a constant depth in the soil irrespective of the position of the subsoiler 30 so that a bed of uniform size and height will be formed, depth gauge means are provided in the form of laterally-spaced gauge wheels 51, each of which is provided with stub shaft 52 rotatably mounted at the end of the forwardly-extending arm 53 affixed to and projecting forwardly from the lower end of an upright 54 secured by a clamp 55 to tool bar 35. Upright 54 is vertically adjustable in clamp 55 in order to vary the operating depth of the listers 38.

Although tool carrier 35 has free vertical floating movement with respect to first tool carrier 23, it is lifted with the latter when the implement 22 is raised to its transport position on the tractor, downward swinging of links 44 and 45 being limited by engagement of plates 40 with the ends of angle bar clamping elements 49 and 50.

From the foregoing it will be clear that a precision tillage unit has been provided which will form a planting bed of uniform size over an opening in the subsoil made by a relatively deeply penetrating earth-working tool, which depth of operation varies with the draft forces acting upon the tool. It should be understood that the invention has been described in its preferred embodiment and that modifications may be made therein without departing from the spirit of the invention or the scope of the appended claims.

What is claimed is:

1. In an earth-working implement for mounting on a tractor having vertically movable draft sensing hitch means thereon, a first rigid transverse tool carrier connected to said hitch means to be raised and lowered therewith and for automatic vertical adjustment of said tool carrier in response to changes in draft conditions, earth-working tools rigidly mounted on said tool carrier and extending downwardly therefrom to penetrate relatively deeply into the soil, a second rigid transverse tool carrier disposed rearwardly of said first tool carrier, earth-working tools rigidly mounted on said second carrier at locations laterally removed from the tools on said first tool carrier and extending downwardly therefrom to penetrate the soil at a relatively shallow depth, linkage extending between and pivotally connected at its ends to said first and second tool carriers to accommodate vertical floating movement of said second carrier relative to said first carrier, and a gauge wheel mounted on said second carrier and engageable with the ground to maintain a constant operating depth for the tools on said second carrier irrespective of the vertical movement of said first tool carrier.

2. The invention set forth in claim 1, wherein an earth-working tool on said first tool carrier forms a relatively deep furrow in the ground and earth-working tools on said second tool carrier form relatively shallow furrows laterally removed from said relatively deep furrow and the earth-working tools on said second tool carrier are adapted to throw dirt laterally and form a raised bed directly over said relatively deep furrow.

3. The invention set forth in claim 2, wherein said first tool carrier is raised to transport position on the tractor by said hitch means and stop means are provided on said first tool carrier for limiting the downward swinging of said linkage, whereby said second tool carrier is raised with said first tool carrier.

References Cited by the Examiner

UNITED STATES PATENTS

| | | | |
|---|---|---|---|
| 2,782,703 | 2/1957 | Chambers et al. | 172—7 |
| 2,884,080 | 4/1959 | Reaves | 172—423 X |
| 2,902,954 | 9/1959 | Stilwell | 111—52 |
| 3,039,540 | 6/1962 | Ward | 172—451 X |
| 3,062,563 | 10/1962 | Pearce | 172—439 |
| 3,170,421 | 2/1965 | Norris et al. | 111—7 X |
| 3,175,622 | 3/1965 | Stam | 172—159 |

FOREIGN PATENTS

| | | |
|---|---|---|
| 1,008,945 | 5/1957 | Germany. |
| 696,973 | 9/1953 | Great Britain. |

ABRAHAM G. STONE, *Primary Examiner.*

J. R. OAKS, *Assistant Examiner.*